United States Patent
Shinkuma

(10) Patent No.: US 10,366,125 B2
(45) Date of Patent: Jul. 30, 2019

(54) OBJECT DISPLAY SYSTEM FOR RELATIONSHIP GRAPH

(71) Applicant: KYOTO UNIVERSITY, Kyoto (JP)

(72) Inventor: Ryoichi Shinkuma, Kyoto (JP)

(73) Assignee: KYOTO UNIVERSITY, Kyoto (JP)

( * ) Notice: Subject to any disclaimer, the term of this patent is extended or adjusted under 35 U.S.C. 154(b) by 295 days.

(21) Appl. No.: 15/126,738

(22) PCT Filed: Feb. 13, 2015

(86) PCT No.: PCT/JP2015/053934
§ 371 (c)(1),
(2) Date: Sep. 16, 2016

(87) PCT Pub. No.: WO2015/141341
PCT Pub. Date: Sep. 24, 2015

(65) Prior Publication Data
US 2017/0220704 A1     Aug. 3, 2017

(30) Foreign Application Priority Data

Mar. 19, 2014   (JP) ................................ 2014-056303

(51) Int. Cl.
*G06F 16/904* (2019.01)
*G06F 16/25* (2019.01)
(Continued)

(52) U.S. Cl.
CPC .......... *G06F 16/904* (2019.01); *G06F 16/258* (2019.01); *G06F 16/9024* (2019.01);
(Continued)

(58) Field of Classification Search
None
See application file for complete search history.

(56) References Cited

U.S. PATENT DOCUMENTS

| 6,154,220 A | 11/2000 | Prakriya et al. |
| 6,486,898 B1 | 11/2002 | Martino et al. |

(Continued)

FOREIGN PATENT DOCUMENTS

| JP | 2002-541571 B | 12/2002 |
| JP | 5413867 B1 | 2/2014 |
| WO | 2012/176317 A1 | 12/2012 |

OTHER PUBLICATIONS

International Search Report dated Jan. 29, 2015, issued in corresponding PCT/EP2014/075850, 3 pages.
(Continued)

*Primary Examiner* — Wilson Lee
(74) *Attorney, Agent, or Firm* — Millen, White, Zelano & Branigan, P.C.; William Nixon

(57) ABSTRACT

An object display system for a relationship graph includes an object information reception unit that receives object information from a terminal device. A node conversion unit converts the object information into a corresponding node and sets the node as a reference point node. A relationship graph extraction unit extracts a relationship graph containing the reference point node from a relationship graph database. A node relationship evaluation unit evaluates the relationship of each node to a reference point node by scores of two types of evaluation indexes. An object arrangement unit converts each node into a corresponding object and arranges each object converted from each node while making scores of two types of evaluation indexes by the node relationship evaluation unit that correspond to a two-dimensional coordinate. An object output unit outputs each object to the terminal device.

11 Claims, 9 Drawing Sheets

(51) Int. Cl.
*G06F 16/901* (2019.01)
*G06Q 50/00* (2012.01)
*G06Q 10/10* (2012.01)
*H04L 12/26* (2006.01)

(52) U.S. Cl.
CPC ............ *G06Q 10/10* (2013.01); *G06Q 50/01* (2013.01); *H04L 43/045* (2013.01)

(56) References Cited

U.S. PATENT DOCUMENTS

| | | | | |
|---|---|---|---|---|
| 2009/0207281 | A1* | 8/2009 | Ono | H04N 5/23245 348/234 |
| 2011/0105881 | A1* | 5/2011 | Kakimoto | G06T 7/0012 600/407 |
| 2011/0252427 | A1* | 10/2011 | Olston | G06F 17/30864 718/102 |
| 2013/0204886 | A1* | 8/2013 | Faith | G06Q 30/631 707/756 |
| 2014/0149376 | A1 | 5/2014 | Kutaragi et al. | |
| 2014/0272822 | A1* | 9/2014 | Yang | G09B 5/02 434/167 |
| 2016/0110476 | A1 | 4/2016 | Shinkuma et al. | |

OTHER PUBLICATIONS

English translation WO2012/176317A1 published Dec. 27, 2012 (1 page).
English translation JP5413867B1 published Feb. 12, 2014 (1 page).
English translation JP2002541571A published Dec. 3, 2002 (1 page).

* cited by examiner

OBJECT DISPLAY SYSTEM FOR RELATIONSHIP GRAPH

TECHNICAL FIELD

The present invention relates to an object display system for a relationship graph for displaying each of a plurality of objects on a screen of a terminal device by arranging each object based on a relationship graph in which nodes of the plurality of objects are connected by links.

BACKGROUND ART

Conventionally, to achieve advanced services, it has been attempted to assign detailed attribution information to individual data. On the other hand, an attempt has been considered to make use of relationships among data in services (see Non-Patent Document 1). Especially, a social relationship, such as, e.g., a relationship among persons and a relationship between a context of person movements and locations has been drawn attention, and the relationship of such data is shown as a relationship graph.

The relationship graph represents, as shown in FIG. 10, objects, such as, e.g., persons, goods, places, and contents, as nodes, and represents the presence or absence of the mutual relationship among these objects by links. Further, the strength of the relationship between nodes directly connected with each other is given by a link length, and the strength of the relationship between nodes connected via other nodes is given by a path length. For this reason, when a certain node is selected as a reference point node, the relationship of the certain node to the reference point node is determined by the network graph structure of the path from the reference point node to the certain node.

By using the information observed in the real world or online as an input source, the object group contained in the input source is created as a node. Further, a link between nodes is also created, and therefore a small relationship graph (subgraph) is created.

Further, by connecting a plurality of subgraphs via a common node, a large one relationship graph is created and stored in a database (see Patent Document 1). In connecting them, when there exists the same link in an overlapped manner, the link length becomes shorter.

Further, a relationship graph stored in a database is referred to by and utilized in various applications. In cases where a relationship graph of persons only is formed using information of SNS (Social Networking Service) as an input source, even if there is no direct link with a certain person, it is possible to present (recommend) another person having a small path length as a future friend. For example, in an e-commerce (electronic commerce) by a mobile terminal, in cases where a relationship graph is formed based on a visit history to places and a purchase history of goods, when a certain consumer visits a certain place, it is possible to recommend goods having a small path length from the consumer and the place on the relationship graph.

PRIOR ART DOCUMENTS

Non-Patent Document

Non-Patent Document 1: R. Shinkuma et al., "New Generation Information Network Architecture Based on Social Metric", IEICE Society Conference, September 2010

Patent Document

Patent Document 1: Japanese Unexamined Patent Application Publication No. 2013-45326

SUMMARY OF THE INVENTION

Problems to be Solved by the Invention

However, in cases where an object group has a network graph structure like the aforementioned relationship graph, as shown in FIG. 10, when it is attempted to display the network graph structure as it is on a normal two-dimensional plane, nodes and links tend to be closely arranged or overlapped, and therefore the display becomes hard to be recognized. This sometimes makes it difficult to operate the relationship graph. Especially, in recent years, although a mobile information terminal, such as, e.g., a smartphone and a tablet, has become popular, in the case of a small screen in such a mobile information terminal, such problem becomes more noticeable.

The present invention was made in view of the aforementioned problems, and aims to provide an object display system for a relationship graph capable of easily and assuredly displaying objects related to the relationship graph to enable a user's browsing and operation.

Means for Solving the Problems

In order to attain the aforementioned objects, the present invention is directed to an object display system for a relationship graph for displaying each object on a screen of a terminal device by arranging each object based on the relationship graph in which nodes of a plurality of objects are connected by links, the object display system includes:

a node table storage unit configured to store a node table in which objects and nodes correspond with each other;

a relationship graph database unit configured to store one or a plurality of relationship graphs;

an object information reception unit configured to receive object information from the terminal device;

a node conversion unit configured to convert the object information received by the object information reception unit into a corresponding node by referring to the node table stored in the node table storage unit and set the node as a reference point node;

a relationship graph extraction unit configured to extract the relationship graph containing the reference point node from the relationship graph database based on the reference point node converted by the node conversion unit;

a node relationship evaluation unit configured to evaluate a relationship to the reference point node for each node in the relationship graph extracted by the relationship graph extraction unit by scores of at least two types of evaluation indexes;

an object arrangement unit configured to convert each node evaluated by the node relationship evaluation unit into a corresponding object by referring to the node table stored in the node table storage unit, and arrange each object converted from each node while making the scores of the at least two types of indexes of each node by the node relationship evaluation unit correspond to at least a two-dimensional coordinate; and an object output unit configured to output each object arranged by the object arrangement unit to the terminal device.

Further, the object display system for a relationship graph may be configured such that the node relationship evaluation unit sets one of the number of hops and a path length of each node to the reference point node as a first evaluation index and also sets the other of the number of hops and the path length as a second evaluation index, and the object arrangement unit arranges each object converted from each node while making a score of the first evaluation index correspond to either one of a first coordinate axis and a second coordinate axis of the two-dimensional coordinate and making a score of the second evaluation index correspond to the other coordinate axis of the two-dimensional coordinate.

Further, the object display system for a relationship graph may be configured such that the node relationship evaluation unit sets one of a path length and the number of common nodes of each node to the reference point node as a first evaluation index and also sets the other of the path length and the number of common nodes as a second evaluation index, and the object arrangement unit arranges each object converted from each node while making a score of the first evaluation index correspond to either one of a first coordinate axis and a second coordinate axis of the two-dimensional coordinate and making a score of the second evaluation index correspond to the other coordinate axis of the two-dimensional coordinate.

Further, the object display system for a relationship graph may be configured such that the node relationship evaluation unit sets one of the number of hops and the number of common nodes of each node to the reference point node as a first evaluation index and sets the other of the number of hops and the number of common nodes of each node to the reference point node as a second evaluation index, and the object arrangement unit arranges each object converted from each node while making a score of the first evaluation index correspond to either one of coordinate axes of a first coordinate axis and a second coordinate axis of the two-dimensional coordinate and also making a score of the second evaluation index correspond to the other coordinate axis of the two-dimensional coordinate.

Further, the object display system for a relationship graph may be configured such that the object information reception unit receives object information regarding the plurality of objects from the terminal device, the node conversion unit converts the plurality of objects of the object information received by the object information reception unit into a corresponding node by referring to the node table stored in the node table storage unit and set each node as a reference point node, the relationship graph extraction unit extracts the relationship graph containing each reference point node from the relationship graph database based on each of the plurality of reference point nodes converted by the node conversion unit, the node relationship evaluation unit evaluates the relationship to each of the plurality of reference point nodes for each node in the relationship graph extracted by the relationship graph extraction unit by scores of the at least two types of evaluation indexes, and the object arrangement unit converts each node evaluated by the node relationship evaluation unit into a corresponding object by referring to the node table stored in the node table storage unit, and arranges each object converted from each node while making the scores of the at least two types of evaluation indexes of each node by the node relationship evaluation unit correspond to at least the two-dimensional coordinate.

The object display system for a relationship graph may be configured such that the evaluation index is an average value of the number of hops, a path length or the number of common nodes of the node to each reference point node in the relationship graph.

The object display system for a relationship graph may be configured such that the evaluation index is a minimum value or a maximum value of the number of hops, a path length, or the number of common nodes of the node to each reference point node in the relationship graph.

Effects of the Invention

According to the present invention, since each object is arranged by a predetermined evaluation index based on a relationship graph, it becomes possible to easily and assuredly display objects related to the relationship graph on a screen of a terminal device, which in turn can facilitate browsing of objects and operations by a user.

EMBODIMENTS FOR CARRYING OUT THE INVENTION

Figure 1:
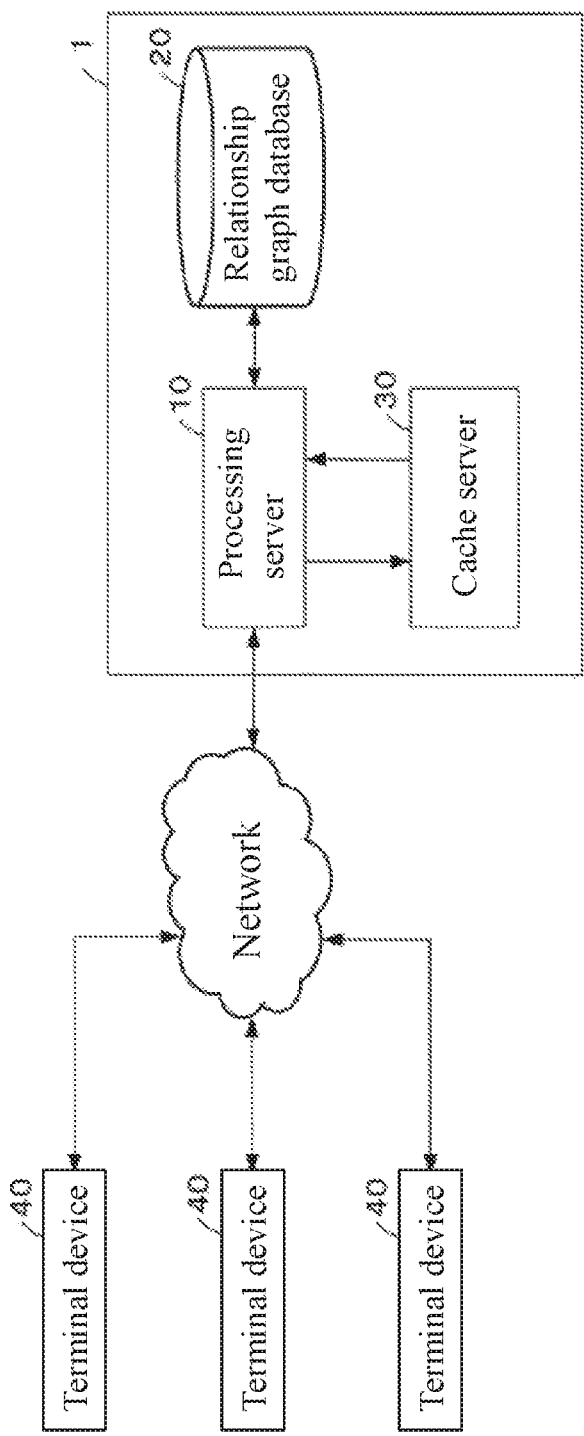
FIG. 1 is a view showing an entire structure of a system model including this system.

Next, Embodiments of an object display system 1 for a relationship graph according to the present invention (hereinafter referred to as "this system 1") will be described with reference to FIGS. 1 to 4.
[General Structure]
FIG. 1 is a view showing a general structure of a system model including this system 1. This system 1 includes, as shown in FIG. 1, a processing server 10, a relationship graph database 20, and a cache server 30, and is connected to user terminal devices 40 via a network, such as, e.g., the Internet, in a communicable manner.

This terminal device 40 can be represented by, for example, a mobile phone, a smart phone, and a tablet terminal equipped with a touch panel type screen. A user selects an object on a touch panel type screen, or specifies an object by inputting an interesting keyword.

Each function of this system 1 or the terminal device 40 performs when a computer program installed in a storage of a computer or a terminal device 40 functioning as the processing server 10 of this system 1 is executed. This computer program can be downloaded from a certain server, or can be transferred or sold in a manner such that it is recorded in a storage medium.

The processing server 10 is capable of communicating with the terminal devices 40 via a network, such as, e.g., the Internet. The specific structure of the processing server 10 will be described later.

The relationship graph database 20 is configured to store a plurality of relationship graphs. This relationship graph represents objects, such as, e.g., persons, goods, places, and contents, as nodes, and represents the presence or absence of the mutual relationship of these objects by links. Further, the strength of the relationship between nodes which are directly connected with each other is given by a link length, and the strength of the relationship between nodes which are connected via other nodes is given by a path length. Further, by using the information observed in the real-world or online as an input source, an object group contained in the input source is created as a node. Further, links among nodes are created, and therefore a small relationship graph (subgraph) is created. Further, by connecting a plurality of subgraphs via a common node, a large single relationship graph is created. This is stored in the relationship graph database 20. At the time of connection, the more there exists the same link in an overlapped manner, the shorter the link length becomes. The creation method of the relationship graph is concretely described in the aforementioned Patent Document 1.

The cache server 30 is configured to store results of the processing performed in the processing server 10 to speed up the processing in the processing server 10.

[Structure of Processing Server 10]

Figure 2:
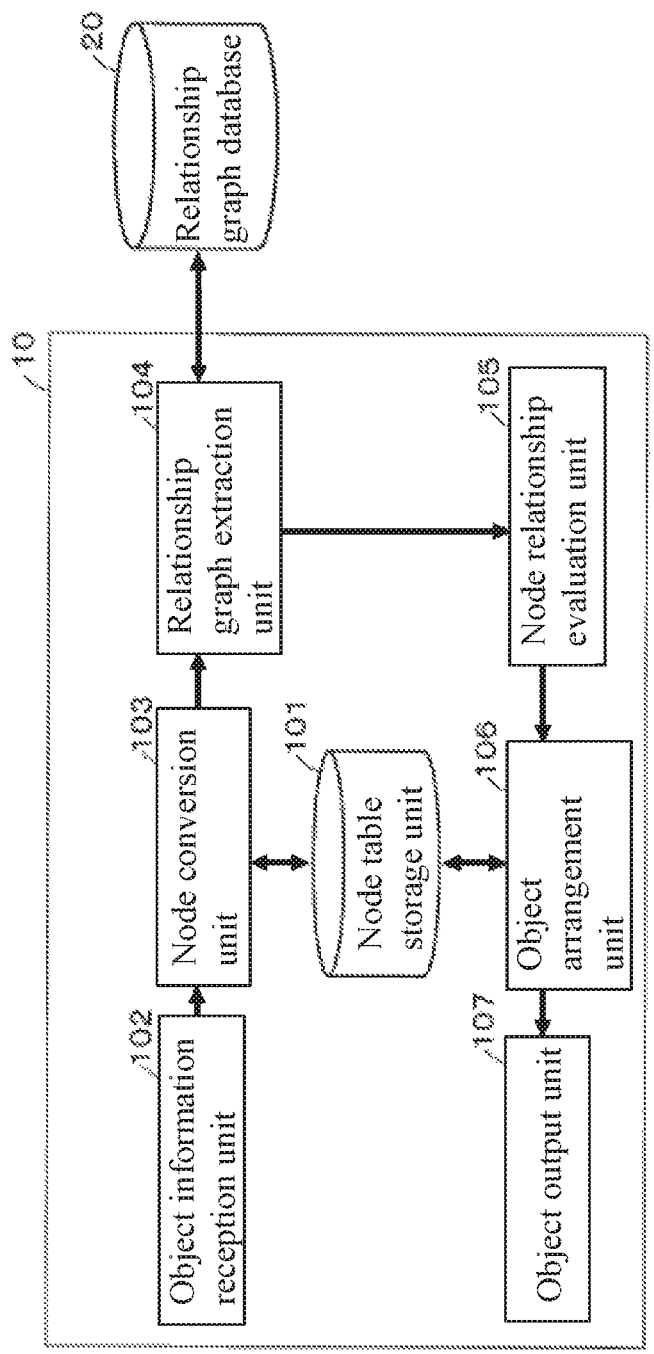
FIG. 2 is a view showing a functional structure of this system.

The processing server 10 is equipped with, as shown in FIG. 2, a node table storage unit 101, an object information reception unit 102, a node conversion unit 103, a relationship graph extraction unit 104, a node relationship evaluation unit 105, an object arrangement unit 106, and an object output unit 107.

The node table storage unit 101 is configured to store a node table in which objects and nodes correspond with each other. The objects denote, for example, persons, goods, places, and contents, and the node denotes each node on the aforementioned relationship graph. The node table is expressed in a tabular format so that these objects and nodes correspond so as to be related with one to one.

The object information reception unit 102 is configured to receive certain object information via a network from the terminal devices 40. This object information denotes information related to an object selected or specified by a user using the terminal device 40. Concrete examples of the object will be exemplified in the following Examples 1 to 5.

The node conversion unit 103 is configured to convert an object into a node. Concretely, the node conversion unit 103 converts the object information received by the object information reception unit 102 into a corresponding node by referring to the node table stored in the node table storage unit 101. Further, the node conversion unit 103 sets the converted node as a reference point node. For example, in cases where the object information received by the object information reception unit 102 is "soccer", the node conversion unit 103 converts the object "soccer" into a corresponding node by referring to the node table stored in the node table storage unit 101 and sets the node as a reference point node.

The relationship graph extraction unit 104 is configured to extract a certain relationship graph from the relationship graph database 20. Concretely, the relationship graph extraction unit 104 extracts a relationship graph containing the reference point node from the relationship graph database 20 based on the reference point node converted by the node conversion unit 103. At this time, it can be exemplified that the relationship graph extraction unit 104 extracts a partial relationship graph within a certain range from the reference point node. The certain range of the relationship graph means that, for example, a path length or the number of hops to the reference point node is within a certain value. It is not limited that the relationship graph extraction unit 104 extracts a partial relationship graph, and the relationship graph extraction unit 104 may extract an entire relationship graph.

The node relationship evaluation unit 105 is configured to evaluate each node in the relationship graph. Specifically, the node relationship evaluation unit 105 evaluates the relationship to the reference point node for each node in the relationship graph extracted by the relationship graph extraction unit 104 by scores of at least two types of evaluation indexes. As the evaluation index, the number of hops to the reference point node, the path length to the reference point node, and the number of common nodes, etc., can be exemplified.

Figure 3:
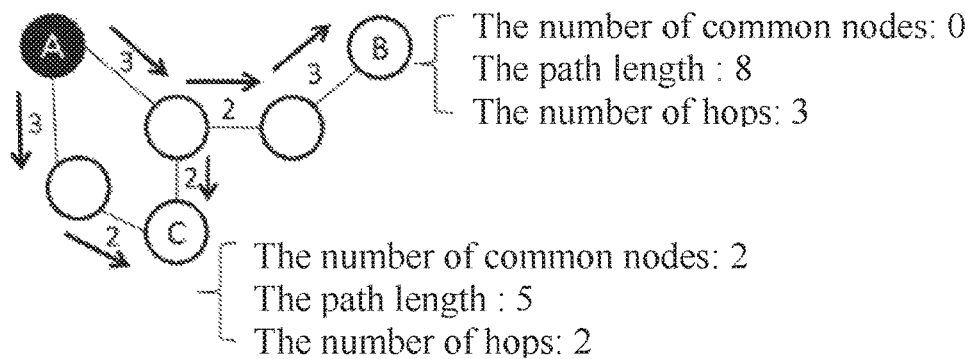
FIG. 3 is a conceptual diagram of a relationship graph.

For example, in the followings, it is considered to evaluate a case in which the number of hops of a node to a reference point node is set as a first evaluation index, a path length of a node to a reference point node is set as a second evaluation index, and the number of common nodes of a node is set as a third evaluation index. In this case, as shown in FIG. 3, for example, as to the node B, the number of hops from the reference point node A is 3, the path length from the reference point node A is 8, and the number of common nodes is 0. Therefore, as the relationship of the node B to the reference point node A, it is evaluated such that the first evaluation index (the number of hops) is score (3), the second evaluation index (the path length) is score (8), and the third evaluation index (the number of common nodes) is score (0). Further, in the same manner, as shown in FIG. 3, for example, as to the node C, the number of hops from the reference point node A is 2, the path length from the reference point node A is 5, and the number of common nodes is 2. Therefore, as the relationship of the node C to the reference point node A, it is evaluated such that the first evaluation index (the number of hops) is score (2), the second evaluation index (the path length) is score (5), and the third evaluation index (the number of common nodes) is score (2).

The object arrangement unit 106 is configured to convert each node of the relationship graph into an object and arrange each object in a certain form. Specifically, the object arrangement unit 106 converts each node evaluated by the node relationship evaluation unit 105 into a corresponding object by referring to the node table stored in the node table storage unit 101. The object arrangement unit 106 arranges each object converted from each node while making scores of at least two types of evaluation indexes of each node by the node relationship evaluation unit 105 correspond to at least a two-dimensional coordinate.

For example, in cases where the node B in the relationship graph and an object "soccer ball" correspond with each other in the node table, the object arrangement unit 106 converts the node B into a corresponding object "soccer ball" by referring to the node table. When the score of the first evaluation index (the number of hops), which is a relationship of the node B to the reference point node A, is 3, the score of the second evaluation index (the path length) is 8, and the score of the third evaluation index (the number of common nodes) is 0, the object arrangement unit 106 arranges the object "soccer ball" converted from the node B while making the object "soccer ball" correspond to the three-dimensional coordinate so that the score (3) of the first evaluation index (the number of hops) becomes a coordinate value of the first coordinate axis, the score (8) of the second evaluation index (the path length) becomes a coordinate value of the second coordinate axis, and the score (0) of the third evaluation index (the number of common nodes) becomes a coordinate value of the third coordinate axis. Thus, in the same manner, when the object arrangement unit 106 arranges other objects while making the other objects correspond to the three-dimensional coordinate, an object group is constituted in which each object is arranged on the three-dimensional coordinate.

The object output unit 107 is configured to output the object group consisting of each object arranged by the object arrangement unit 106 to the terminal device 40 via the network to thereby display the object group on the screen of the terminal device 40. In displaying each object on a screen of the terminal device 40, it may be configured to display each object such that one object group can be browsed in a screen of the terminal device 40, such that one object group can be browsed by scrolling the screen of the terminal device 40, or such that one object group can be browsed by switching the screens of the terminal device 40. Thus, it becomes possible for a user to browse the object group displayed on the screen of the terminal device 40 or operate the object group on the screen.

In this embodiment, the node relationship evaluation unit 105 evaluates the relationship of the node to the reference point node by the scores of three evaluation indexes, i.e., the first evaluation index, the second evaluation index, and the third evaluation index. However, it may be configured such that the node relationship evaluation unit 105 evaluates the relationship by scores of two, four or more evaluation indexes.

Further, the node relationship evaluation unit 105 evaluates the number of hops of the node to the reference point node as the first evaluation index, the path length of the node to the reference point node as the second evaluation index, and the number of common nodes of the node as the third evaluation index. However, the combination is not limited to the above, and may be a combination of other evaluation indexes.

Further, the object arrangement unit 106 displays the object in a three-dimensional coordinate. However, it may be configured such that the object is displayed in a two-dimensional coordinate, or four or more dimensional coordinate.

Further, the object arrangement unit 106 makes the first evaluation index correspond to the first coordinate axis, makes the second evaluation index correspond to the second coordinate axis, and makes the third evaluation index correspond to the third coordinate axis. However, correspondence relationships are not limited to the above, and may be other corresponding relationships.

Further, the object arrangement unit 106 arranges in an absolute manner such that the scores of the first and second evaluation indexes are made to correspond to the coordinate values of the first and second coordinate axes of the two-dimensional coordinate, respectively. However, it may be configured such that the scores are relatively arranged based on the relative magnitude relationship of the first and second evaluation indexes.

Further, an evaluation index of a node to one reference point node in a relationship graph is evaluated. However, it may be configured to evaluate evaluation an index of a node to a plurality of reference point nodes. In this case, as a score of the evaluation index of the node to the plurality of reference point nodes, an average number of hops, an average path length, and an average number of common nodes may be exemplified.

[Operation of this System 1]

Figure 4:
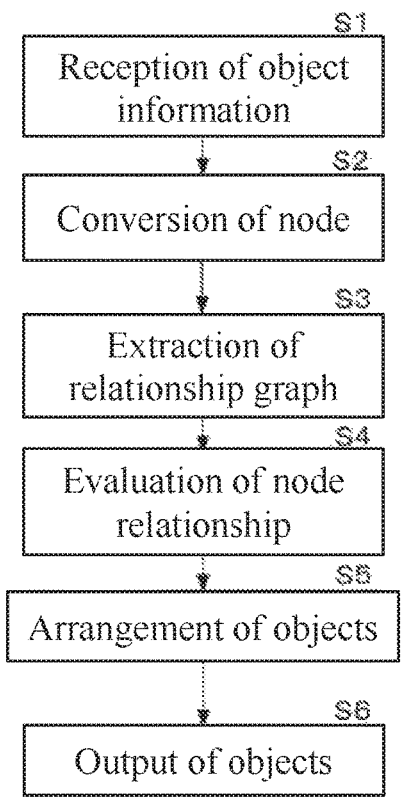
FIG. 4 is a flowchart showing operations of this system.

Next, the operation of this system 1 will be described with reference to the flowchart shown in FIG. 4. In the following description, "Step" will be abbreviated as "S".

Initially, the object information reception unit 102 receives certain object information from the terminal device 40 via the network (S1).

Then, the node conversion unit 103 converts the object information received by the information reception unit 102 into a corresponding node by referring to the node table stored in the node table storage unit 101 (S2).

Then, the relationship graph extraction unit 104 extracts a relationship graph containing a reference point node from the relationship graph based on the reference point node converted by the node conversion unit 103.

Then, the node relationship evaluation unit 105 evaluates the relationship to the reference point node for each node in the relationship graph extracted by the relationship graph extraction unit 104 by scores of at least two types of evaluation indexes (S4). As to concrete examples of the evaluation index by this node relationship evaluation unit 105, in the following Examples 1 to 5, concrete explanation will be made.

The object arrangement unit 106 converts each node evaluated by the node relationship evaluation unit 105 into a corresponding object by referring to the node table stored in the node table storage unit 101, and arranges each object converted from each node while making the scores of at least two types of indexes of each node by the node relationship evaluation unit 105 correspond to at least a two-dimensional coordinate (S5). As to the arrangement method of each object by the object arrangement unit 106, in the following Examples 1 to 5, concrete explanation will be made.

Then, the object output unit 107 outputs the object group consisting of each object arranged by the object arrangement unit 106 to the terminal device 40 via the network to thereby display the object group on the screen of the terminal device 40 (S6).

EXAMPLE

Example 1

(Two-Dimensional Coordinate Display of the Number of Hops/the Path Length)

Figure 5:
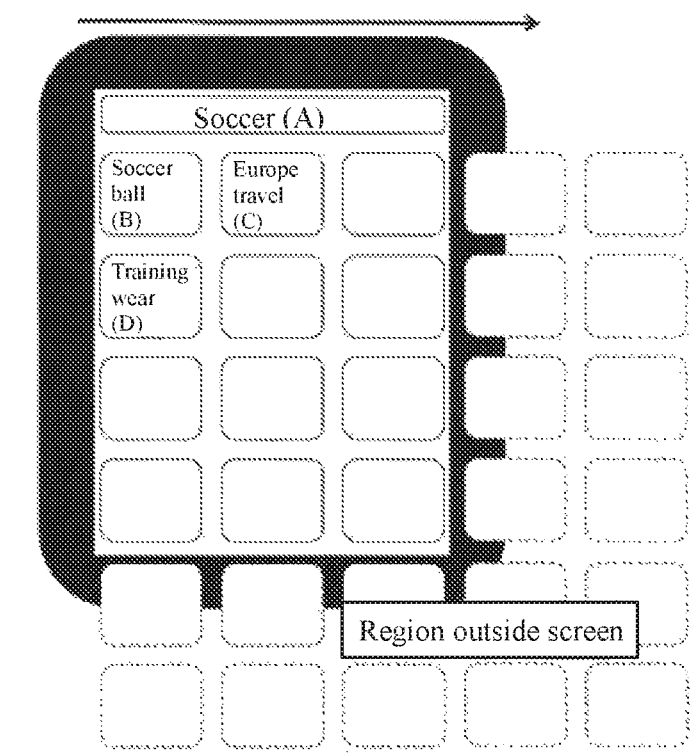
FIG. 5 is a view showing a screen display of objects according to Example 1.

In this Example, as shown in FIG. 5, the number of hops of the node to the reference point node in the relationship graph is set as a first evaluation index, the path length of the node to the reference point node is set as a second evaluation index, and the first evaluation index and the second evaluation index are made to correspond to the first coordinate axis and the second coordinate axis of a two-dimensional coordinate, respectively.

Specifically, the node relationship evaluation unit 105 evaluates the relationship to the reference point node for each node in the relationship graph extracted by the relationship graph extraction unit 104 by setting the number of hops of the node to the reference point node as a first evaluation index and the path length of the node to the reference point node as a second evaluation index.

Further, the object arrangement unit 106 converts each node evaluated by the node relationship evaluation unit 105 into a corresponding object by referring to the node table stored in the node table storage unit 101. And, the object arrangement unit 106 arranges the objects converted from the nodes while making the objects correspond to the two-dimensional coordinate so that the score of the first evaluation index (the number of hops) of each node by the node relationship evaluation unit 105 becomes a coordinate value of the first coordinate axis and the score of the second evaluation index (the path length) becomes a coordinate value of the second coordinate axis. In the two-dimensional coordinate of this Example, it is set such that the coordinate value increases as it advances in the rightward direction in the first coordinate and the coordinate value increases as it advances in the downward direction of the second coordinate axis.

For example, focusing on the reference point node A and the nodes B, C, and D close to the reference point node A in a relationship graph, it is assumed that the reference point node A and an object "soccer" correspond with each other, the node B and an object "soccer ball" correspond with each other, the node C and an object "Europe travel" correspond with each other, and the node D and an object "training wear" correspond with each other. And, it is assumed that the number of hops of the node B to the reference point node A is 1, which is the minimum value among nodes, and the path length to the reference point node A is 1, which is the minimum value among nodes. Further, it is assumed that the number of hops of the node C to the reference point node A is 2, which is the second least value among nodes, and in the same manner as in the node B, the path length of the node C to the reference point node A is 1, which is the minimum value among nodes. And, in the same manner as in the node B, it is assumed that the number of hops of the node D to the reference point node A is 1, which is the minimum value among nodes, and the path length of the node D to the reference point node A is 2, which is the second least value among nodes.

In this case, the node relationship evaluation unit 105 evaluates the relationship of the node B to the reference point node A such that the score of the first evaluation index (the number of hops) is 1 and the score of the second evaluation index (the path length) is 1. Further, the node relationship evaluation unit 105 evaluates the relationship of the node C to the reference point node A such that the score of the first evaluation index (the number of hops) is 2 and the score of the second evaluation index (the path length) is 1. Further, the node relationship evaluation unit 105 evaluates the relationship of the node D to the reference point node A such that the score of the first evaluation index (the number of hops) is 1 and the score of the second evaluation index (the path length) is 2.

Further, the object arrangement unit 106 converts the nodes B, C, and D evaluated by the node relationship evaluation unit 105 into corresponding objects "soccer ball", "Europe travel", and "training wear", respectively, by referring to the node table stored in the node table storage unit 101.

Further, the object arrangement unit 106 arranges the object "soccer ball" converted from the node B on the first row of the first coordinate axis and the first row of the second coordinate axis of the two-dimensional coordinate so that the score (1) of the first evaluation index (the number of hops) becomes a coordinate value of the first coordinate axis and the score (1) of the second evaluation index (the path length) becomes a coordinate value of the second coordinate axis. Further, the object arrangement unit 106 arranges the object "Europe travel" converted from the node C on the second row of the first coordinate axis and the first row of the second coordinate axis of the two-dimensional coordinate so that the score (2) of the first evaluation index (the number of hops) becomes a coordinate value of the first coordinate axis and the score (1) of the second evaluation index (the path length) becomes a coordinate value of the second coordinate axis. Further, the object arrangement unit 106 arranges the object "training ware" converted from the node D on the first row of the first coordinate axis and the second row of the second coordinate axis of the two-dimensional coordinate so that the score (1) of the first evaluation index (the number of hops) becomes a coordinate value of the first coordinate axis and the score (2) of the second evaluation index (the path length) becomes a coordinate value of the second coordinate axis.

Thus, the screen of the terminal device 40 displays a two-dimensional object group arranged such that the first evaluation index (the number of hops) corresponds to the first coordinate axis and the second evaluation index (the path length) corresponds to the second coordinate axis. The screen sequentially displays objects larger in the number of hops as the screen is scrolled in the rightward direction and sequentially displays objects larger in the path length as the screen is scrolled in the downward direction.

Thus, the number of hops indicates whether other objects directly or indirectly relate to the object "soccer", and the path length indicates the magnitude of the degree of interest that a user interested in the object "soccer" feels with respect to other objects. For this reason, as the screen of the terminal device 40 is scrolled in the rightward direction, objects higher in unpredictability for the user will be displayed, and as the screen of the terminal device 40 is scrolled in the downward direction, objects smaller in the degree of interest for the user will be displayed.

Example 2

(Two-Dimensional Coordinate Display of the Number of Common Nodes/the Path Length)

Figure 6:
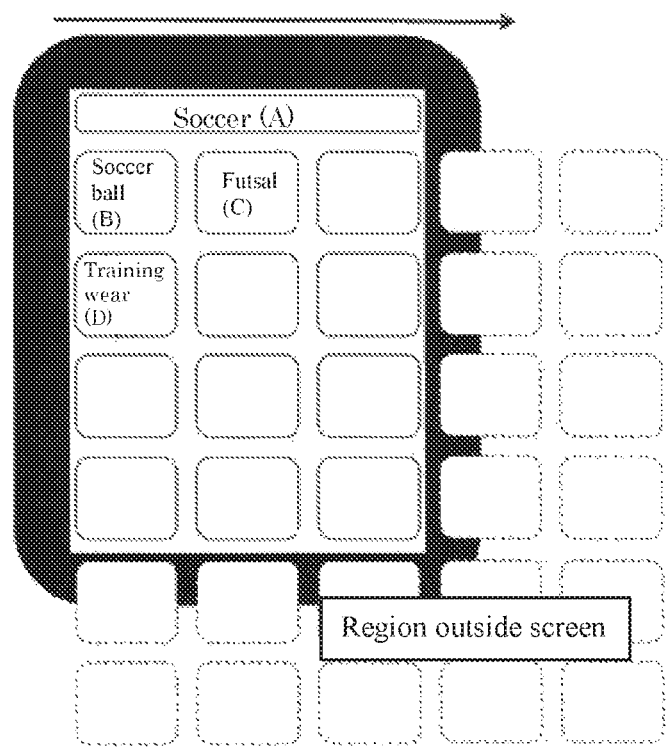
FIG. 6 is a view showing a screen display of objects according to Example 2.

In this Example, as shown in FIG. 6, the number of common nodes of a node to a reference point node in the relationship graph is set as a first evaluation index, the path length of a node to the reference point node is set as a second evaluation index, and the first evaluation index and the second evaluation index are made to correspond to the first coordinate axis and the second coordinate axis of a two-dimensional coordinate, respectively.

Specifically, the node relationship evaluation unit 105 evaluates the relationship to the reference point node for each node in the relationship graph extracted by the relationship graph extraction unit 104 by setting the number of common nodes of the node to the reference point node as the first evaluation index and the path length of the node to the reference point node as the second evaluation index.

Further, the object arrangement unit 106 converts each node evaluated by the node relationship evaluation unit 105 into a corresponding object by referring to the node table stored in the node table storage unit 101. And, the object arrangement unit 106 arranges the objects converted from the nodes while making the objects correspond to the two-dimensional coordinate so that the score of the first evaluation index (the number of common nodes) of each node by the node relationship evaluation unit 105 becomes a coordinate value of the first coordinate axis and the score of the second evaluation index (the path length) becomes a coordinate value of the second coordinate axis. In the two-dimensional coordinate of this Example, it is set such that the coordinate value decreases as it advances in the rightward direction in the first coordinate and the coordinate value increases as it advances in the downward direction of the second coordinate axis.

For example, focusing on the reference point node A and the nodes B, C, and D close to the reference point node A in a relationship graph, it is assumed that the reference point node A and an object "soccer" correspond with each other, the node B and an object "soccer ball" correspond with each other, the node C and an object "futsal" correspond with each other, and the node D and an object "training wear" correspond with each other. And, it is assumed that the number of common nodes of the node B to the reference point node A is 100, which is the maximum value among nodes and the path length to the reference point node A is 1, which is the minimum value among nodes. Further, it is assumed that the number of common nodes of the node C to the reference point node A is 99, which is the second least value among nodes and the path length to the reference point node A is 1, which is the minimum value among nodes. And, in the same manner as in the node B, it is assumed that the number of common nodes of the node D to the reference point node A is 100, which is the maximum value among nodes and the path length to the reference point node A is 2, which is the second least value among nodes.

In this case, the node relationship evaluation unit 105 evaluates the relationship of the node B to the reference point node A such that the score of the first evaluation index (the number of common nodes) is 100 and the score of the second evaluation index (the path length) is 1. Further, the node relationship evaluation unit 105 evaluates the relationship of the node C to the reference point node A such that the score of the first evaluation index (the number of common nodes) is 99 and the score of the second evaluation index (the path length) is 1. Further, the node relationship evaluation unit 105 evaluates the relationship of the node D to the reference point node A such that the score of the first evaluation index (the number of common nodes) is 100 and the score of the second evaluation index (the path length) is 2.

Further, the object arrangement unit 106 converts each node B, C, and D evaluated by the node relationship evaluation unit 105 into corresponding objects "soccer ball", "futsal", and "training wear", respectively, by referring to the node table stored in the node table storage unit 101.

Further, the object arrangement unit 106 arranges the object "soccer ball" converted from the node B on the first row of the first coordinate axis and the first row of the second coordinate axis so that the score (100) of the first evaluation index (the number of common nodes) becomes a coordinate value of the first coordinate axis and the score (1) of the second evaluation index (the path length) becomes a coordinate value of the second coordinate axis. Further, the object arrangement unit 106 arranges the object "futsal" converted from the node C on the second row of the first coordinate axis and the first row of the second coordinate axis so that the score (99) of the first evaluation index (the number of common nodes) becomes a coordinate value of the first coordinate axis and the score (1) of the second evaluation index (the path length) becomes a coordinate value of the second coordinate axis. Further, the object arrangement unit 106 arranges the object "training ware" converted from the node D on the first row of the first coordinate axis and the second row of the second coordinate axis so that the score (100) of the first evaluation index (the number of common nodes) becomes a coordinate value of the first coordinate axis and the score (2) of the second evaluation index (the path length) becomes a coordinate value of the second coordinate axis.

Thus, the screen of the terminal device 40 displays a two-dimensional object group arranged such that the first evaluation index (the number of common nodes) corresponds to the first coordinate axis and the second evaluation index (the path length) corresponds to the second coordinate axis. The screen sequentially displays objects smaller in the number of common nodes as the screen is scrolled in the rightward direction and sequentially displays objects larger in the path length as the screen is scrolled in the downward direction.

Thus, the number of common modes indicates the degree of similarity of other objects to the object "soccer", and the path length indicates the magnitude of the degree of interest that a user interested in the object "soccer" feels with respect to other objects. For this reason, as the screen of the terminal device 40 is scrolled in the rightward direction, objects lower in the degree of similarity to the object "soccer" will be displayed, and as the screen of the terminal device 40 is scrolled in the downward direction, objects smaller in the degree of interest for the user will be displayed.

Example 3

(Two-Dimensional Coordinate Display of the Number of Hops/the Number of Common Nodes)

Figure 7:
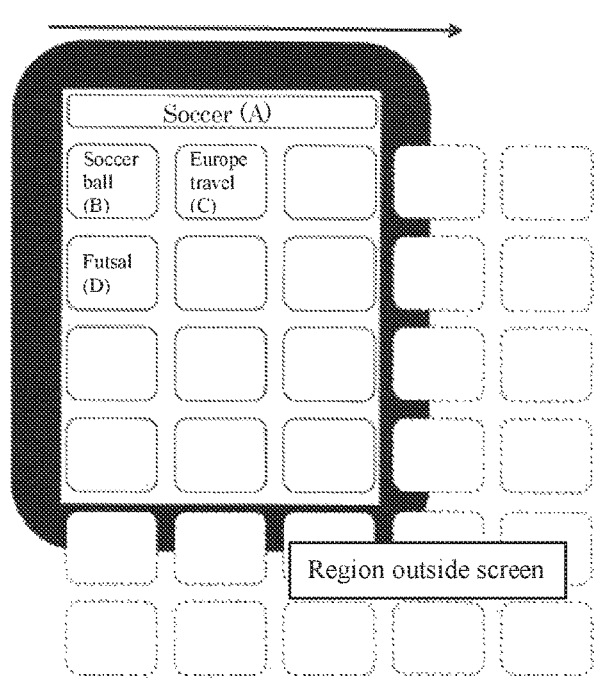
FIG. 7 is a view showing a screen display of objects according to Example 3.

In this Example, as shown in FIG. 7, the number of hops of a node to a reference point node in the relationship graph is set as a first evaluation index, the number of common nodes of a node to the reference point node is set as a second evaluation index, and the first evaluation index and the second evaluation index are made to correspond to the first coordinate axis and the second coordinate axis of a two-dimensional coordinate, respectively.

Specifically, the node relationship evaluation unit 105 evaluates the relationship to a reference point node for each node in the relationship graph extracted by the relationship graph extraction unit 104 by setting the number of hops of the node to the reference point node as a first evaluation index and the number of common nodes of the node to the reference point node as a second evaluation index.

Further, the object arrangement unit 106 converts each node evaluated by the node relationship evaluation unit 105 into a corresponding object by referring to the node table stored in the node table storage unit 101. And, the object arrangement unit 106 arranges the objects converted from the nodes while making the objects correspond to the two-dimensional coordinate so that the score of the first evaluation index (the number of hops) of each node by the node relationship evaluation unit 105 becomes a coordinate value of the first coordinate axis and the score of the second evaluation index (the number of common nodes) becomes a coordinate value of the second coordinate axis. In the two-dimensional coordinate of this Example, it is set such that the coordinate value increases as it advances in the right direction in the first coordinate and the coordinate value decreases as it advances in the downward direction of the second coordinate axis.

For example, focusing on the reference point node A and the nodes B, C, and D close to the reference point node A in a relationship graph, it is assumed that the reference point node A and an object "soccer" correspond with each other, the node B and an object "soccer ball" correspond with each other, the node C and an object "Europe travel" correspond with each other, and the node D and an object "futsal" correspond with each other. And, it is assumed that the number of hops of the node B to the reference point node A is 1, which is the minimum value among nodes and in the number of common nodes to the reference point node A is 100, which is the maximum value among nodes. And, it is assumed that the number of hops of the node C to the reference point node A is 2, which is the second least value among nodes and in the same manner as in the node B, the number of common nodes to the reference point node A is 100, which is the maximum value among nodes. And, it is assumed that the number of hops of the node D to the reference point node A is 1 in the same manner as in the node B, which is the minimum value among nodes and the number of common nodes to the reference point node A is 99, which is the second least value among nodes.

In this case, the node relationship evaluation unit 105 evaluates the relationship of the node B to the reference point node A such that the score of the first evaluation index (the number of hops) is 1 and the score of the second evaluation index (the number of common nodes) is 100. Further, the node relationship evaluation unit 105 evaluates the relationship of the node C to the reference point node A such that the score of the first evaluation index (the number of hops) is 2 and the score of the second evaluation index (the number of common nodes) is 100. Further, the node relationship evaluation unit 105 evaluates the relationship of the node D to the reference point node A such that the score of the first evaluation index (the number of hops) is 1 and the score of the second evaluation index (the number of common nodes) is 99.

Further, the object arrangement unit 106 converts each node B, C, and D evaluated by the node relationship evaluation unit 105 into corresponding objects "soccer ball", "Europe travel", and, "futsal", respectively, by referring to the node table stored in the node table storage unit 101.

Further, the object arrangement unit 106 arranges the object "soccer ball" converted from the node B on the first row of the first coordinate axis and the first row of the second coordinate axis so that the score (1) of the first evaluation index (the number of hops) becomes a coordinate value of the first coordinate axis and the score (100) of the second evaluation index (the number of common nodes) becomes a coordinate value of the second coordinate axis. Further, the object arrangement unit 106 arranges the object "Europe travel" converted from the node C on the second row of the first coordinate axis and the first row of the second coordinate axis so that the score (2) of the first evaluation index (the number of hops) becomes a coordinate value of the first coordinate axis and the score (100) of the second evaluation index (the number of common nodes) becomes a coordinate value of the second coordinate axis. Further, the object arrangement unit 106 arranges the object "futsal" converted from the node D on the first row of the first coordinate axis and the second row of the second coordinate axis so that the score (1) of the first evaluation index (the number of hops) becomes a coordinate value of the first coordinate axis and the score (99) of the second evaluation index (the number of common nodes) becomes a coordinate value of the second coordinate axis.

Thus, the screen of the terminal device 40 displays a two-dimensional object group arranged such that the first evaluation index (the number of hops) corresponds to the first coordinate axis and the second evaluation index (the number of common nodes) corresponds to the second coordinate axis. The screen sequentially displays objects larger in the number of hops as the screen is scrolled in the rightward direction and sequentially displays objects smaller in the number of common nodes as the screen is scrolled in the downward direction.

Thus, the number of hops indicates whether other objects directly or indirectly relate to the object "soccer", and the number of common nodes indicates the degree of similarity of the other objects to the object "soccer". For this reason, as the screen of the terminal device 40 is scrolled in the rightward direction, objects higher in unpredictability for the user will be displayed, and as the screen of the terminal device 40 is scrolled in the downward direction, objects smaller in the degree of similarity to the object "soccer" will be displayed.

Example 4

(Two-Dimensional Coordinate Display by Two Reference Point Nodes)

Figure 8:
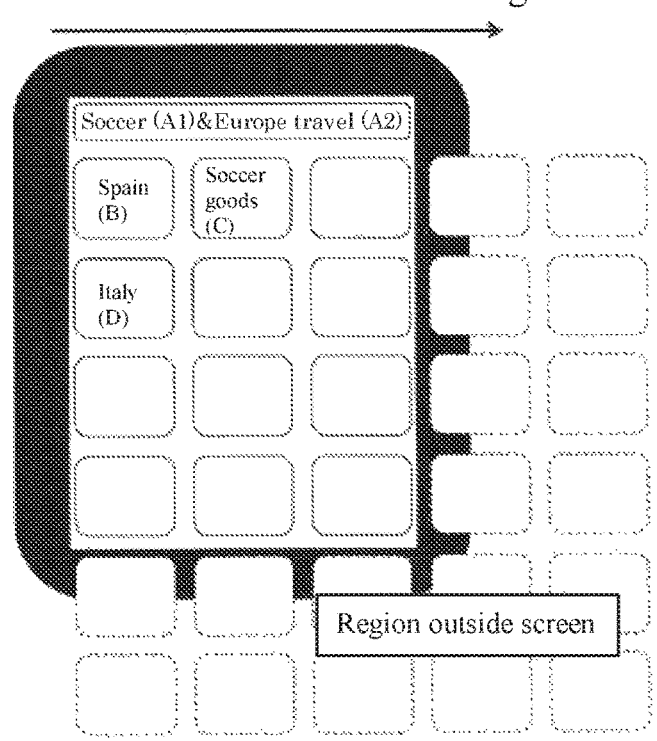
FIG. 8 is a view showing a screen display of objects according to Example 4.

In this Example, as shown in FIG. 8, object information regarding two objects is received from the terminal device 40, and these two objects are set as reference point nodes of the relationship graph, respectively. Further, the average number of hops of a node to a reference point node in each relationship graph is set as a first evaluation index, the average path length of the node to the reference point node is set as a second evaluation index, and the first evaluation index and the second evaluation index are made to correspond to the first coordinate axis and the second coordinate axis of a two-dimensional coordinate, respectively.

Specifically, the node relationship evaluation unit 105 evaluates the relationship to the reference point node for each node in the relationship graph extracted by the relationship graph extraction unit 104 by setting the average number of hops of the node to the reference point node as the first evaluation index and the average path length of the node to the reference point node as the second evaluation index.

Further, the object arrangement unit 106 converts each node evaluated by the node relationship evaluation unit 105 into a corresponding object by referring to the node table stored in the node table storage unit 101. And, the object arrangement unit 106 arranges the objects converted from the nodes while making the nodes correspond to the two-dimensional coordinate so that the score of the first evaluation index (the average number of hops) of each node by the node relationship evaluation unit 105 becomes a coordinate value of the first coordinate axis and the score of the second evaluation index (the average path length) becomes a coordinate value of the second coordinate axis. In the two-dimensional coordinate of this Example, it is set such that the coordinate value increases as it advances in the right direction in the first coordinate and the coordinate value increases as it advances in the downward direction of the second coordinate axis.

For example, focusing on the reference point nodes A1 and A2 and the nodes B, C, and D close to the reference point nodes A1 and A2 in a relationship graph, it is assumed that the reference point nodes A1 and A2 and objects "soccer" and "Europe travel" correspond with each other, respectively, the node B and an object "Spain" correspond with each other, the node C and an object "soccer goods" correspond with each other, and the node D and an object "Italy" correspond with each other. And, it is assumed that the average number of hops of the node B to the reference point nodes A1 and A2 is 1, which is the minimum value among nodes and the average path length to the reference point nodes A1 and A2 is 1, which is the minimum value among nodes. Further, it is assumed that the average number of hops of the node C to the reference point nodes A1 and A2 is 2, which is the second least value among nodes, and in the same manner as in the node B, the average path length to the reference point nodes A1 and A2 is 1, which is the minimum value among nodes. Further, in the same manner as in the node B, it is assumed that the average number of hops of the node D to the reference point nodes A1 and A2 is 1, which is the minimum value among nodes, and the average path length to the reference point nodes A1 and A2 is 2, which is the second least value among nodes.

In this case, the node relationship evaluation unit 105 evaluates the relationship of the node B to the reference point nodes A1 and A2 such that the score of the first evaluation index (the average number of hops) is 1, and the score of the second evaluation index (the average path length) is 1. Further, the node relationship evaluation unit 105 evaluates the relationship of the node C to the reference point nodes A1 and A2 such that the score of the first evaluation index (the average number of hops) is 2, and the score of the second evaluation index (the average path length) is 1. Further, the node relationship evaluation unit 105 evaluates the relationship of the node D to the reference point nodes A1 and A2 such that the score of the first evaluation index (the average number of hops) is 1, and the score of the second evaluation index (the average path length) is 2.

Further, the object arrangement unit 106 converts each node B, C, and D evaluated by the node relationship evaluation unit 105 into corresponding objects "Spain", "soccer goods", and "Italy", respectively, by referring to the node table stored in the node table storage unit 101.

Further, the object arrangement unit 106 arranges the object "Spain" converted from the node B on the first row of the first coordinate axis and the first row of the second coordinate axis so that the score (1) of the first evaluation index (the average number of hops) becomes a coordinate value of the first coordinate axis and the score (1) of the second evaluation index (the average path length) becomes a coordinate value of the second coordinate axis. Further, the object arrangement unit 206 arranges the object "soccer goods" converted from the node C on the second row of the first coordinate axis and the first row of the second coordinate axis so that the score (2) of the first evaluation index (the average number of hops) becomes a coordinate value of the first coordinate axis, and the score (1) of the second evaluation index (the average path length) becomes a coordinate value of the second coordinate axis. Further, the object arrangement unit 206 arranges the object "Italy" converted from the node D on the first row of the first coordinate axis and the second row of the second coordinate axis so that the score (1) of the first evaluation index (the average number of hops) becomes a coordinate value of the first coordinate axis, and the score (2) of the second evaluation index (the average path length) becomes a coordinate value of the second coordinate axis.

Thus, the screen of the terminal device 40 displays a two-dimensional object group arranged such that the first evaluation index (the average number of hops) corresponds to the first coordinate axis and the second evaluation index (the average path length) corresponds to the second coordinate axis. The screen sequentially displays objects larger in the average number of hops as the screen is scrolled in the rightward direction and sequentially displays objects larger in the average path length as the screen is scrolled in the downward direction.

Thus, the average number of hops indicates whether other objects directly or indirectly relate to the objects "soccer" and "Europe travel", and the average path length indicates the magnitude of the degree of interest that a user interested in the objects "soccer" and "Europe travel" feels with respect to other objects. For this reason, as the screen of the terminal device 40 is scrolled in the rightward direction, objects higher in unpredictability for the user will be displayed, and as the screen of the terminal device 40 is scrolled in the downward direction, objects smaller in the degree of interest for the user will be displayed.

In this Example, although an average number of hops, which is an average value of the number of hops of a node to each reference point node, is used as a score of the first evaluation index, the minimum value or the maximum value of the number of hops of a node to each reference point node may be used. Further, although an average path length, which is an average value of the path length of a node to each reference point node, is used, the minimum value or the maximum value of the path length of a node to each reference point node may be used. Further, as the first and second evaluation indexes, although the average number of hops, the average path length, etc., are used, an average number of common nodes, which is an average value of the number of common nodes of a node may be used.

According to the above, by setting a plurality of objects as reference point nodes, an object group can be displayed from two or more viewpoints based on the directness, the degree of interest, or the degree of similarity, which are characteristics corresponding to the number of hops, the path length, and the number of common nodes, respectively.

Example 5

(Three-Dimensional Coordinate Display of the Number of Hops/the Path Length/the Number of Common Nodes)

Figure 9:
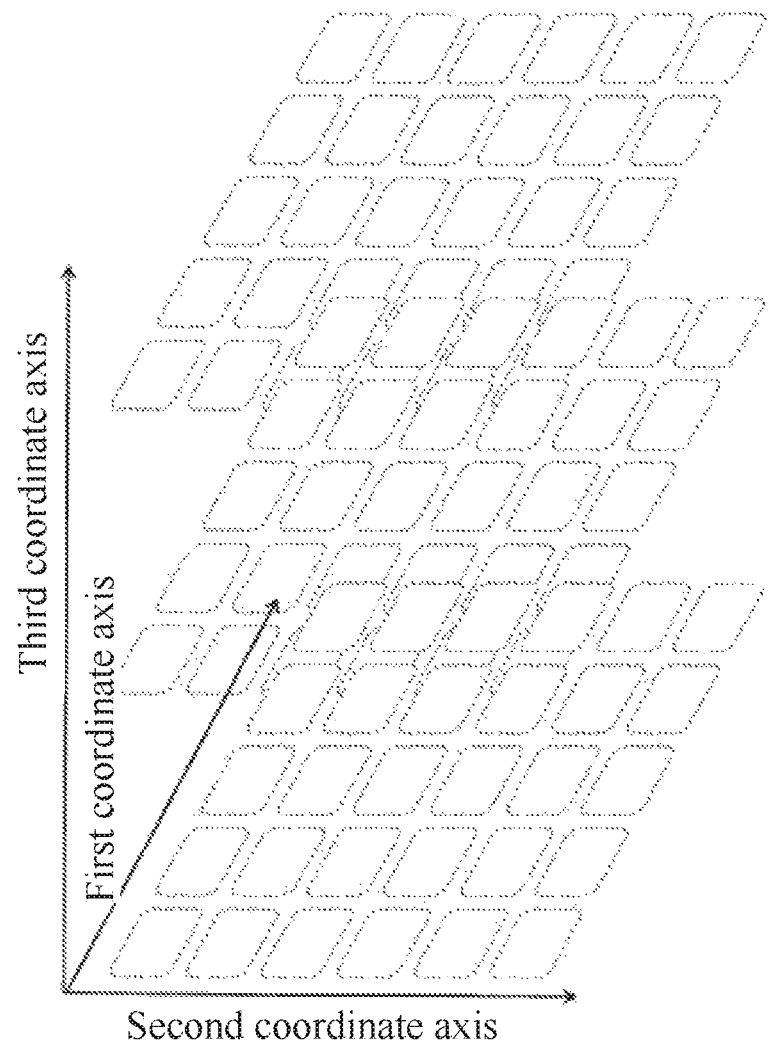
FIG. 9 is a view showing a screen display of objects according to Example 5.
Figure 10:
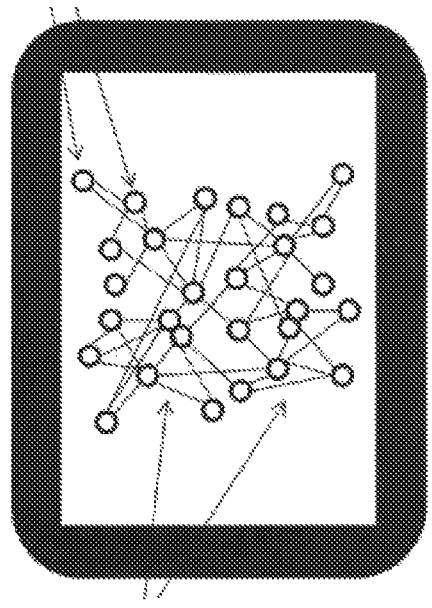
FIG. 10 is a view showing a screen display of a network structure of a relationship graph.

In this Example, as shown in FIG. 9, as to the number of hops, the path length, and the number of common nodes of a node to the reference point node, as the first evaluation index, the second evaluation index, and the third evaluation index, the first evaluation index, the second evaluation index, and the third evaluation index are made to correspond to the first coordinate axis, the second coordinate axis, and the third coordinate axis of a three-dimensional coordinate, respectively.

Specifically, the node relationship evaluation unit 105 evaluates the relationship to the reference point node for each node in the relationship graph extracted by the relationship graph extraction unit 104 by setting the number of hops, the path length, and the number of common nodes of the node to the reference point node as the first evaluation index, the second evaluation index, and the third evaluation index, respectively.

Further, the object arrangement unit 106 converts each node evaluated by the node relationship evaluation unit 105 into a corresponding object by referring to the node table stored in the node table storage unit 101. Further, the object arrangement unit 106 arranges the objects converted from the nodes while making the objects correspond to the three-dimensional coordinate so that the score of the first evaluation index of each node by the node relationship evaluation unit 105 becomes a coordinate value of the first coordinate axis, the score of the second evaluation index of each node becomes a coordinate value of the second coordinate axis, and the score of the third evaluation index of each node becomes a coordinate value of the third coordinate axis, Accordingly, the screen of the terminal device 40 displays an object group arranged three-dimensionally so that the first evaluation index corresponds to the first coordinate axis, the second evaluation index corresponds to the second coordinate axis, and the third evaluation index corresponds to the third coordinate axis. The screen sequentially displays objects in which the score of the first evaluation index is based as the screen is scrolled in the rightward direction, sequentially displays objects in which the score of the second evaluation index is based as the screen is scrolled in the downward direction, and sequentially displays objects in which the score of the third evaluation index is based as the screen is switched.

According to this, even in the case of a mobile phone, a smartphone, or a tablet terminal in which a screen is small and the display area is limited, the objects group consisting of a plurality of objects can be displayed while making the object group correspond to a three-dimensional coordinate on the basis of the scores of three evaluation indexes, which in turn can improve visibility and operability.

Although Examples of the present invention were described above with reference to the drawings, the present invention is not limited to the illustrated Examples. To the illustrated Examples, various corrections and/or modifications can be made within the same scope or within the equivalent range of the present invention.

DESCRIPTION OF THE REFERENCE SYMBOLS

1 . . . this system
10 . . . processing server
101 . . . node table storage unit
102 . . . object information reception unit
103 . . . node conversion unit
104 . . . relationship graph extraction unit
105 . . . node relationship evaluation unit
106 . . . object arrangement unit
107 . . . object output unit
20 . . . relationship graph database
30 . . . cache server

The invention claimed is:

1. An object display system for displaying each object of a network structure relationship graph on a screen of a terminal device by arranging each object based on the relationship graph in which nodes of a plurality of objects are connected by links, the object display system comprising:
 a processing server;
 a memory storage coupled to the processing server, wherein the memory storage includes instructions to configure the processing server to implement
 a node table storage unit configured to store a node table in which objects and nodes correspond with each other;
 a relationship graph database unit configured to store one or a plurality of network structure relationship graphs;
 an object information reception unit configured to receive object information input into the terminal device;
 a node conversion unit configured to convert the object information received by the object information reception unit into a corresponding node by referring to the node table stored in the node table storage unit and set the node as a reference point node;
 a relationship graph extraction unit configured to extract the network structure relationship graph containing the reference point node from the relationship graph database based on the reference point node converted by the node conversion unit;
 a node relationship evaluation unit configured to evaluate a relationship to the reference point node for each node in the network structure relationship graph extracted by the relationship graph extraction unit by scores of at least two types of evaluation indexes;
 an object arrangement unit configured to convert each node evaluated by the node relationship evaluation unit into a corresponding object by referring to the node table stored in the node table storage unit, and arrange each object converted from each node while making the scores of the at least two types of indexes of each node by the node relationship evaluation unit correspond to a plurality of axes of at least a two-dimensional coordinate for an object group of the network structure relationship graph; and
 an object output unit configured to output each object arranged in the at least two-dimensional coordinate for the object group by the object arrangement unit to display on the terminal device.

2. The object display system as recited in claim 1, wherein the node relationship evaluation unit sets one of the number of hops and a path length of each node to the reference point node as a first evaluation index and also sets the other of the number of hops and the path length as a second evaluation index, and
 wherein the object arrangement unit arranges each object converted from each node while making a score of the first evaluation index correspond to a first coordinate axis of the plurality of axes of the two-dimensional coordinate and making a score of the second evaluation index correspond to a second coordinate axis of the plurality of axes of the two-dimensional coordinate.

3. The object display system as recited in claim 1, wherein the node relationship evaluation unit sets one of a path length and the number of common nodes of each node to the reference point node as a first evaluation index and also sets the other of the path length and the number of common nodes as a second evaluation index, and
 wherein the object arrangement unit arranges each object converted from each node while making a score of the first evaluation index correspond to a first coordinate axis of the plurality of axes of the two-dimensional coordinate and making a score of the second evaluation index correspond to a second coordinate axis of the plurality of axes of the two-dimensional coordinate.

4. The object display system as recited in claim 1, wherein the node relationship evaluation unit sets one of the number of hops and the number of common nodes of each node to the reference point node as a first evaluation index and sets the other of the number of hops and the number of common nodes of each node to the reference point node as a second evaluation index, and
 wherein the object arrangement unit arranges each object converted from each node while making a score of the first evaluation index correspond to a first coordinate axis of the plurality of axes of the two-dimensional coordinate and also making a score of the second evaluation index correspond to a second coordinate axis of the plurality of axes of the two-dimensional coordinate.

5. The object display system as recited in claim 1, wherein the object information reception unit receives object information regarding the plurality of objects from the terminal device, wherein the node conversion unit converts the plurality of objects of the object information received by the object information reception unit into a corresponding node by referring to the node table stored in the node table storage unit and set each node as a reference point node, wherein the relationship graph extraction unit extracts the relationship graph containing each reference point node from the relationship graph database based on each of the plurality of reference point nodes converted by the node conversion unit, wherein the node relationship evaluation unit evaluates the relationship to each of the plurality of reference point nodes for each node in the relationship graph extracted by the relationship graph extraction unit by scores of the at least two types of evaluation indexes, and wherein the object arrangement unit converts each node evaluated by the node relationship evaluation unit into a corresponding object by referring to the node table stored in the node table storage unit, and arranges each object converted from each node while making the scores of the at least two types of evaluation indexes of each node by the node relationship evaluation unit correspond to at least the two-dimensional coordinate.

6. The object display system as recited in claim 5, wherein the evaluation index is an average value of the number of hops, a path length or the number of common nodes of the node to each reference point node in the network structure relationship graph.

7. The object display system as recited in claim 5, wherein the evaluation index is a minimum value or a maximum value of the number of hops, a path length, or the number of common nodes of the node to each reference point node in the network structure relationship graph.

8. The object display system as recited in claim 1, wherein the relationship graph extraction unit is configured to extract the relationship graph as a partial relationship graph within a range from the reference point node.

9. The object display system as recited in claim 8, wherein the range corresponds to a path length or a number of hops to the reference point node.

10. The object display system as recited in claim 1, wherein the terminal includes a screen such that the two-dimensional displays each object arranged in the at least two-dimensional coordinate for the object group on the screen.

11. The object display system as recited in claim 10, wherein the terminal is a mobile device, a smart phone, or a tablet.

* * * * *